US009154839B2

(12) United States Patent
Koganei et al.

(10) Patent No.: US 9,154,839 B2
(45) Date of Patent: Oct. 6, 2015

(54) OPERATION SOUND GUIDE APPARATUS AND OPERATION SOUND GUIDE METHOD (75) Inventors: Tomohiro Koganei, Osaka (JP); Jun'ichi Kotani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 341 days.

(21) Appl. No.: 13/518,384

(22) PCT Filed: Nov. 11, 2010

(86) PCT No.: PCT/JP2010/006636
§ 371 (c)(1),
(2), (4) Date: Jun. 21, 2012

(87) PCT Pub. No.: WO2011/080864
PCT Pub. Date: Jul. 7, 2011

(65) Prior Publication Data
US 2012/0256952 A1    Oct. 11, 2012

(30) Foreign Application Priority Data

Dec. 28, 2009    (JP) ................................ 2009-297395

(51) Int. Cl.
*G06F 3/048*    (2013.01)
*G06F 13/00*    (2006.01)
*H04N 21/443*    (2011.01)
*H04N 21/482*    (2011.01)
*G09B 21/00*    (2006.01)
(Continued)

(52) U.S. Cl.
CPC ............ *H04N 21/443* (2013.01); *G06F 3/0482* (2013.01); *G06F 3/04812* (2013.01); *G09B 21/006* (2013.01); *G09B 21/008* (2013.01); *H04N 21/482* (2013.01)

(58) Field of Classification Search
CPC ..... G06F 3/0484; G06F 3/0488; G06F 3/0421; G06F 3/0487; H04M 1/72583
USPC ........... 345/157, 619, 902; 725/39, 44–47, 56
See application file for complete search history.

(56) References Cited

U.S. PATENT DOCUMENTS 5,393,147 A * 2/1995 Ueno et al. ...................... 400/65
6,449,767 B1 * 9/2002 Krapf et al. .................... 725/110
(Continued)

FOREIGN PATENT DOCUMENTS

EP    0528743 A1    2/1993
JP    04216117 A *  8/1992    ................ G06F 3/02
(Continued)

*Primary Examiner* — Todd Buttram
(74) *Attorney, Agent, or Firm* — James W. Judge (57) ABSTRACT Information about a base position at which a cursor operation has been started is stored in a storage section (212). When an operation of moving the cursor is accepted from a remote controller (217), the information about the base position of the cursor is acquired from the storage section (212), and is compared with information about the position to which the cursor has been moved, whereby it is determined that the cursor has returned to the base position. In this case, an operation sound generation section (216) acquires an operation sound different from the normal one from an operation sound ROM (215), and a sound signal superimposing section (207) superimposes the different operation sound onto a sound signal which is to be outputted from a speaker (211). Thus, a user can easily recognize that the cursor has returned to the base position.

6 Claims, 9 Drawing Sheets (51) Int. Cl.
*G06F 3/0482* (2013.01)
*G06F 3/0481* (2013.01)

(56) References Cited

U.S. PATENT DOCUMENTS

| | | | |
|---|---|---|---|
| 7,194,753 B1* | 3/2007 | Fries et al. | 725/38 |
| 2003/0234824 A1 | 12/2003 | Litwiller | |
| 2005/0235316 A1* | 10/2005 | Ahmad-Taylor | 725/44 |
| 2006/0080708 A1* | 4/2006 | Miyazawa et al. | 725/39 |
| 2007/0261079 A1* | 11/2007 | Pack et al. | 725/60 |
| 2008/0088621 A1* | 4/2008 | Grimaud et al. | 345/421 |
| 2009/0031240 A1* | 1/2009 | Hildreth | 715/772 |
| 2009/0031361 A1* | 1/2009 | Song et al. | 725/62 |
| 2010/0039383 A1* | 2/2010 | Kadoi | 345/158 |

FOREIGN PATENT DOCUMENTS

| | | |
|---|---|---|
| JP | H09-258946 A | 10/1997 |
| JP | 2004-252652 A | 9/2004 |
| JP | 2004-254006 A | 9/2004 |
| JP | 2004-288073 A | 10/2004 |
| JP | 2005-234818 A | 9/2005 |
| JP | 2007-087104 A | 4/2007 |
| JP | 2009-145965 A | 7/2009 |
| WO | WO-2007-134644 A1 | 11/2007 |

* cited by examiner

OPERATION SOUND GUIDE APPARATUS AND OPERATION SOUND GUIDE METHOD

TECHNICAL FIELD

The present invention relates to an operation sound guide apparatus and an operation sound guide method which control an operation sound accompanying a cursor movement on an electronic program guide of a digital television or the like, thus improving operability in selection of a program.

BACKGROUND ART

Along with improvement in performance of a microprocessor or the like stored in consumer electronic apparatuses and professional electronic apparatuses, the functions of the electronic apparatuses have dramatically improved. As a result, a conventional mechanical push button is insufficient as an input method for operating the electronic apparatuses. Instead, a combination of an operation screen and a push button, or a touch panel type of operation screen is frequently used. Such an operation screen has a multilayer configuration to orderly group the functions, thereby facilitating the operation which tends to be complicated.

Meanwhile, in the case where such an input operation using an operation screen is provided, a user with impaired vision may not be able to view the operation screen or may have difficulty viewing the operation screen. Therefore, an apparatus that allows such a user to perform an operation being assisted by sound for explaining each item, is used. However, given that a large number of candidate items are displayed on the screen and that there are a large number of multilayer screens, assistance by only sound information is not necessarily sufficient. That is, problems occur in which a user repeatedly returns to the same item or a user hardly recognizes which screen the user is operating, of the multiplayer screens.

In order to solve or relieve such problems, for example, Patent Literature 1 changes the kind or tone of sound produced when an operation button is pressed, depending on each layer, thereby facilitating identification of the current layer that a user is operating. For example, the tone of sound is changed in accordance with the depth of the layer.

In Patent Literature 2, if a user repeatedly returns to the same menu item being confused about the operation, a special explanation is outputted as sound when a cursor has moved to the menu item, whereby the user's operation is assisted. For each menu item, a counter counts the number of times the menu item is designated by the cursor. If the number of times exceeds a predetermined value, the special explanation is outputted.

CITATION LIST

Patent Literature

[PTL 1] Japanese Laid-Open Patent Publication No. 2004-288073
[PTL 2] Japanese Laid-Open Patent Publication No. 2005-234818

SUMMARY OF THE INVENTION

Problems to be Solved by the Invention

As described above, by using the method of Patent Literature 1, even a user with impaired vision can recognize which of the multilayer screens is currently displayed as the operation screen, based on the output sound. Therefore, it is considered that a certain degree of effect can be obtained if recognition of the layer helps to improve the operability of the apparatus currently used. However, after all, it is a layer that a user can recognize in the above method. That is, a user can only recognize what kind of operation screen is currently displayed. Therefore, a user cannot discriminate or recognize a specific menu item on the screen. In addition, as in an electronic program guide on a television screen, in the case where a user searches for a desired menu item (e.g., a specific program on an electronic program guide) by scrolling through one screen on which an enormous number of items are to be displayed, layer (grouping) setting is not used. Therefore, the method of Patent Literature 1 is not applicable.

On the other hand, by using the method of Patent Literature 2, when a user repeatedly returns to the same position getting lost on the operation screen, the position (menu item) is indicated by sound, whereby a user with impaired vision can recognize the position where the user is lost. If the user recognizes the position, i.e., the current location, the user can use it as a hint for searching for the correct desired menu item again. Therefore, that method is used for recognition of where a user is lost, and may be helpful if a user can recognize the relative positional relationship between that position and the correct desired menu item. However, in general, since it is not likely that a user can recognize such a relative positional relationship, it cannot be expected that great effect is obtained in practice.

The present invention has been made to solve the above problems. An object of the present invention is to provide an operation sound guide apparatus and an operation sound guide method that allow a user, in screen operation of an electronic program guide on which a large number of items are displayed, to easily recognize that a cursor has returned to a base position at which the cursor operation was started, thus improving the operability in selection of a program.

Solution to the Problems

In order to achieve the above object, an operation sound guide apparatus according to one aspect of the present invention, when one of a plurality of information items that are displayed is selected by a cursor being moved, informs about an information item to which the cursor has moved by a specific sound. The operation sound guide apparatus includes: a storage section configured to store the plurality of information items, base information indicating an information item at an initial position of the cursor, and current information indicating the information item to which the cursor has moved; an operation information input section configured to receive input of operation information about the cursor; a screen rendering processing section configured to render the plurality of information items and the cursor; a video signal superimposing section configured to superimpose, onto the video signal, the plurality of information items and the cursor that have been rendered; an operation sound generation section configured to generate an operation sound when the cursor is operated; a sound signal superimposing section configured to superimpose the generated operation sound onto the sound signal; and a control section configured to: move the cursor so as to select one of the plurality of information items, based on the operation information about the cursor that is inputted to the operation information input section; compare the base information and the current information with each other by acquiring the base information and the current information from the storage section; and cause the operation sound generation section to generate a first operation sound if the base information and the current information coincide with each other, and to generate a second operation sound if the base information and the current information do not coincide with each other.

Owing to the above configuration, even when a user operates a screen including a large number of displayed items such as a screen of a digital television on which menu items or an electronic program guide is displayed, the user can easily recognize a base position at which the operation was started. Thus, the operability in selection of a program can be improved.

Advantageous Effects of the Invention

According to the present invention, it becomes possible to allow a user to, in screen operation of an electronic program guide on which a large number of items are displayed, easily recognize that a cursor has returned to a base position at which the cursor operation was started, thus improving the operability in selection of a program. The present invention is further effectively applicable particularly to a supporting guide for reading out a large number of items by sound.

DESCRIPTION OF EMBODIMENTS

Hereinafter, operation sound guide apparatuses according to various embodiments of the present invention will be described with reference to the drawings. It is noted that the operation sound guide apparatuses of the present invention correspond to normal digital televisions.

First Embodiment

Figure 1:
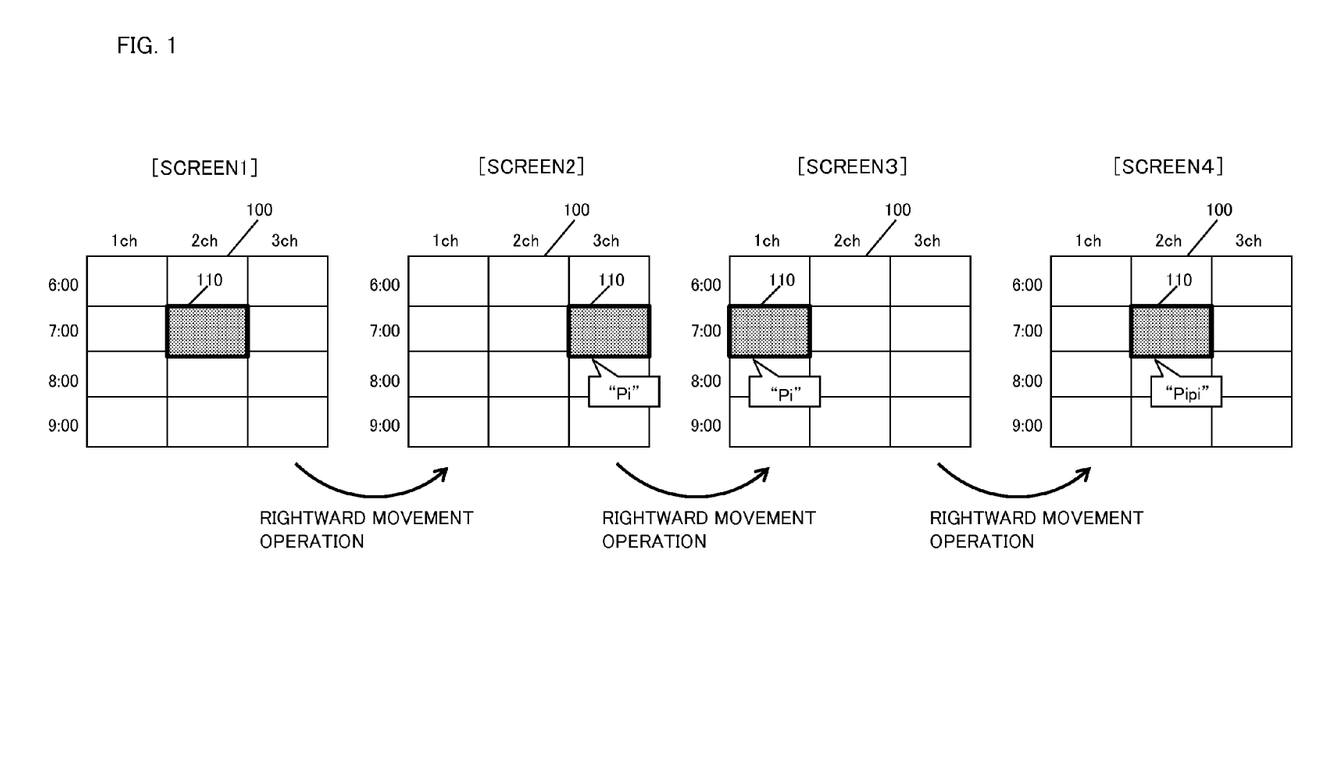
FIG. 1 is a schematic diagram showing operations on an electronic program guide screen of an operation sound guide apparatus according to the present invention.

FIG. 1 is a schematic diagram showing movement of a cursor on an electronic program guide screen and operation sounds caused as a result of the movement, realized by the operation sound guide apparatus according to the present invention. Screens 1 to 4 show an electronic program guide 100 which is simplified for facilitating the description. On the electronic program guide 100, a table is formed on which digital television broadcast stations "1 ch" to "3 ch" are displayed in the horizontal axis direction and the broadcasting times "6:00" to "9:00" are displayed in the vertical axis direction.

On the electronic program guide 100, a specific program is visually indicated by a cursor 110. The screens 1 to 4 show sequential movements of the cursor 110 based on an operation to move the cursor 110. The screen 1 is a screen displayed when the electronic program guide 100 is activated. At this time, the initial position of the cursor 110 is at a program of 2 ch in a time slot of 7:00. This position is a base position. Normally, a program to be set at a base position is a program that is currently broadcasted by a broadcast station that has been viewed just before the electronic program guide screen is activated.

From that state, if a user performs an operation of moving the cursor 110 rightward, the cursor 110 moves to the next program on the right, i.e., a program of 3 ch in the same time slot (screen 2). Along with this operation, an electronic sound "Pi" is outputted as shown in the drawing, for example. Then, if a user performs a rightward movement operation again, the cursor 110 transfers to 1 ch at the left end because 3 ch is the right end in the drawing (screen 3). Also here, the operation sound "Pi" is outputted.

Then, if a user further performs a rightward movement operation, the cursor 110 moves to the next program on the right, i.e., the program of 2 ch in the same time slot. Here, as described above, the base position of the cursor 110 when the electronic program guide has been activated is 2 ch. Therefore, in the operation at this time by which the cursor 110 has returned to the original channel 2 ch, an operation sound "Pipi" which is different from the normal one is outputted in order to aurally inform a user that the cursor 110 has returned to the broadcast station corresponding to the base position. Thus, a user can aurally and easily recognize that, as a result of the cursor movement operation, the cursor 110 has returned to 2 ch which is the broadcast station corresponding to the base position.

Although in FIG. 1, the number of broadcast stations is three for facilitating the description, terrestrial broadcasts from five to ten stations can be received in actual digital television broadcasting. In addition, programs of BS broadcasting and CS broadcasting, and even cable television broadcasting can be included at the same time in the electronic program guide 100. In some cases, the number of broadcast stations can reach several tens. In such a case, as a matter of course, since programs of all the broadcast stations cannot be displayed on one screen, a user needs to scroll the screen in the horizontal direction while operating the cursor. Therefore, in cursor movement operation, it is extremely useful to output an operation sound for informing a user that the cursor has returned to the broadcast station corresponding to the base position after moving through the broadcast stations.

Figure 2:
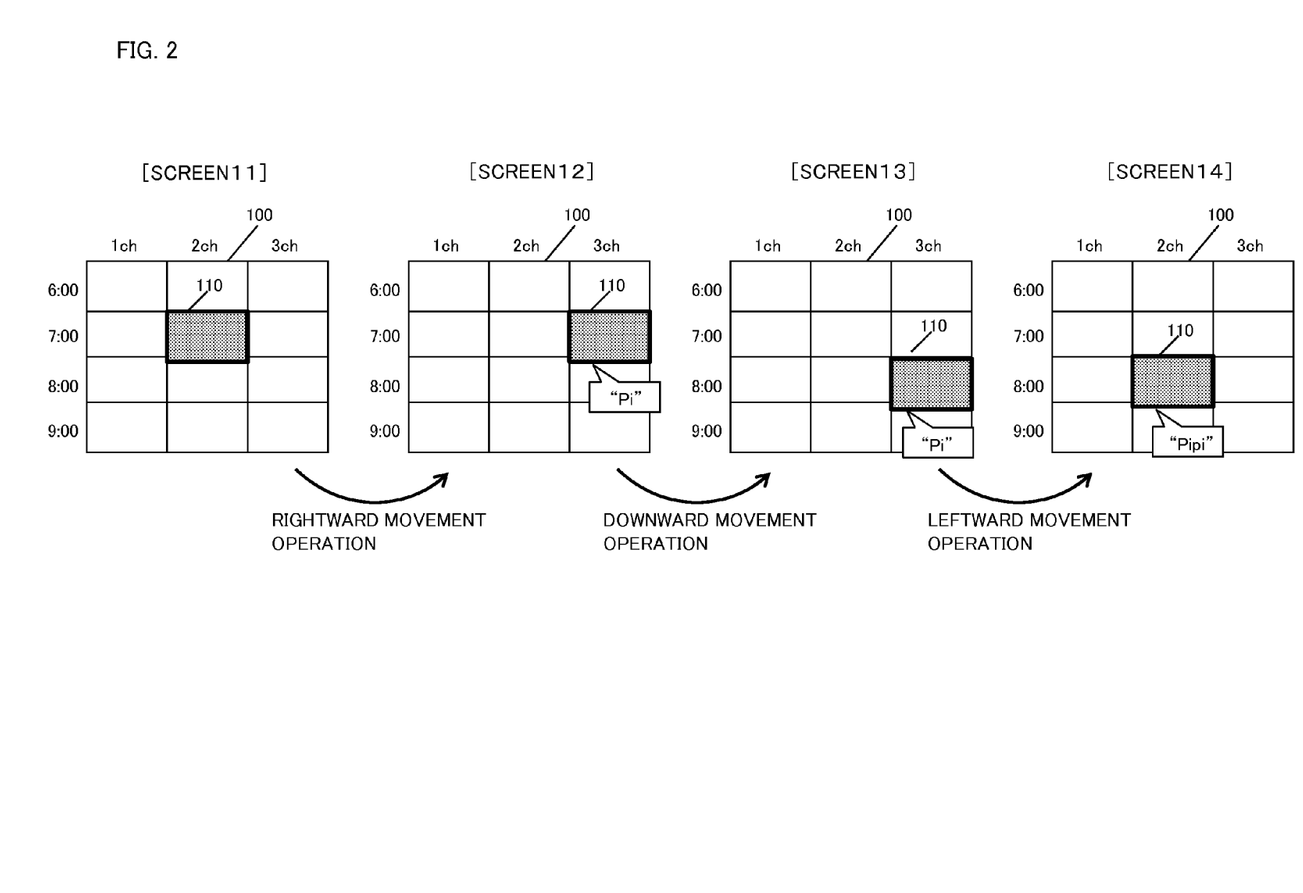
FIG. 2 is a schematic diagram showing other operations on the electronic program guide screen of the operation sound guide apparatus according to the present invention.

In FIG. 1, the cursor 110 merely moves in the horizontal direction in the same time slot. Here, the purpose of outputting the different operation sound is to inform a user that the cursor 110 has returned to a broadcast station corresponding to the base position. Therefore, for example, also when the cursor 110 has returned to 2 ch after moving to a different time slot as shown in FIG. 2, the different operation sound is outputted as in FIG. 1 to inform a user that the cursor 110 has returned to a broadcast station corresponding to the base position. In FIG. 2, a screen 11 shows a screen displayed when the electronic program guide 100 is activated. At this time, the initial position of the cursor 110 is at a program of 2 ch in a time slot of 7:00. This position is a base position.

From that state, if a user performs an operation of moving the cursor 110 rightward, the cursor 110 moves to the next program on the right, i.e., a program of 3 ch in the same time slot (screen 12). Along with this operation, an electronic sound "Pi" is outputted. Then, if a user performs a downward movement operation, the cursor 110 moves to a time slot of 8:00 (screen 13). Also here, the operation sound "Pi" is outputted.

Then, if a user performs a leftward movement operation, the cursor 110 moves to the next program on the left, i.e., a program of 2 ch in the time slot of 8:00 (screen 14). Here, as described above, the base position of the cursor 110 when the electronic program guide has been activated is 2 ch. Therefore, in the operation at this time by which the cursor 110 has returned to the original channel 2 ch, an operation sound "Pipi" which is different from the normal one is outputted in order to aurally inform a user that the cursor 110 has returned to the broadcast station corresponding to the base position.

Figure 3:
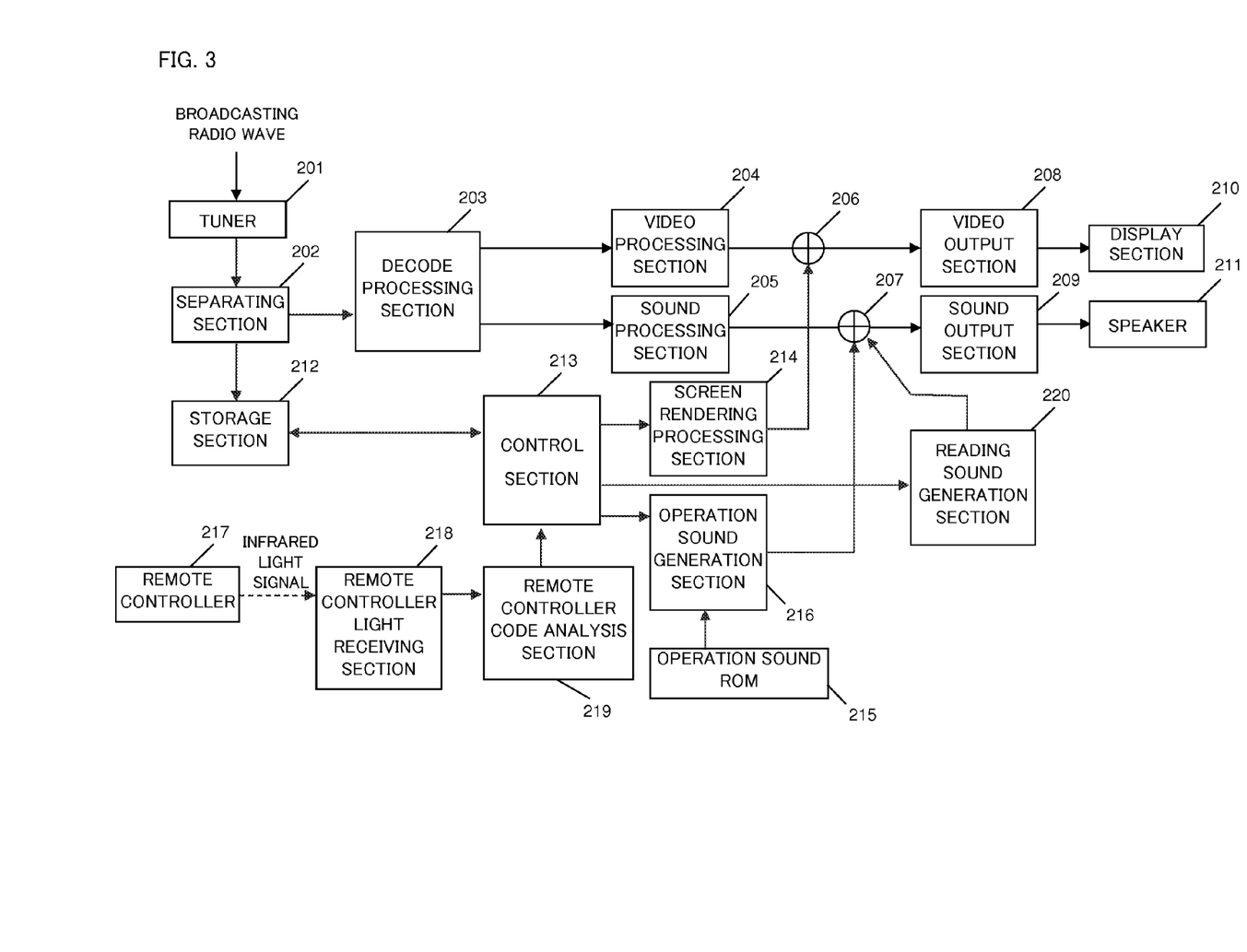
FIG. 3 is a block diagram showing an example of the configuration of the operation sound guide apparatus according to the first embodiment of the present invention.

FIG. 3 is a block diagram showing an example of the configuration of the operation sound guide apparatus according to the present embodiment. The operation sound guide apparatus includes a tuner 201, a separating section 202, a decode processing section 203, a video processing section 204, a sound processing section 205, a video signal superimposing section 206, a sound signal superimposing section 207, a video output section 208, a sound output section 209, a display section 210, a speaker 211, a storage section 212, a control section 213, a screen rendering processing section 214, an operation sound ROM 215, an operation sound generation section 216, a remote controller 217, a remote controller light receiving section (operation information input section) 218, a remote controller code analysis section 219, and a reading sound generation section 220.

A broadcasting radio wave received by an antenna (not shown) is inputted to the tuner (reception section) 201. The tuner 201 performs amplification, channel tuning, and demodulation for the broadcasting radio wave, extracts digital data that includes a video signal, a sound signal, and an attachment data signal, and outputs the digital data to the separating section 202.

The separating section 202 receives an output from the tuner 201, and separates the output into MPEG (Moving Picture Experts Group) data that includes the video signal and the sound signal, and the attachment data that includes the electronic program guide 100. The decode processing section 203 decodes the MPEG data and outputs the video signal and the sound signal to the video processing section 204 and the sound processing section 205, respectively.

The video processing section 204 performs various video processes such as brightness adjustment and color tone adjustment for the decoded video signal. The sound processing section 205 performs various sound processes such as volume adjustment and sound quality adjustment for the decoded sound signal.

The video signal superimposing section 206 superimposes a video signal outputted from the screen rendering processing section 214, onto a video signal outputted from the video processing section 204. The sound signal superimposing section 207 superimposes a sound signal outputted from the operation sound generation section 216 and a sound signal outputted from the reading sound generation section 220, onto a sound signal outputted from the sound processing section 205.

The video output section 208 converts a video signal outputted from the video signal superimposing section 206, to a predetermined display format, and outputs the converted video signal to the display section 210. The sound output section 209 amplifies a sound signal outputted from the sound signal superimposing section 207, and outputs the amplified sound signal to the speaker 211. The display section 210 is a display device. For example, a liquid crystal display panel or a plasma display panel is used for the display section 210. The speaker (sound generation section) 211 is a normal audio speaker. It is noted that the speaker 211 is not limited to a single device but may be composed of a plurality of devices for realizing a stereo operation, a divisional operation based on sound frequency bands, a surround reproduction operation, or the like.

The storage section 212 stores the electronic program guide 100 included in the attachment data extracted by the separating section 202, and base information and current information about the cursor 110. The control section 213 controls a series of operations in the operation sound guide apparatus, such as: extraction of necessary information from relevant information about the electronic program guide; movement of cursor display performed in accordance with an operation of the remote controller 217; control of the operation sound generation section 216 based on comparison between the base information and the current information about the cursor 110; and output of information about a program designated by the cursor 110 to the reading sound generation section 220.

The screen rendering processing section 214 generates an image by rendering the electronic program guide 100 and the cursor 110, and outputs the image. The operation sound ROM 215 stores data for generating an operation sound. The operation sound generation section 216 acquires necessary data from the operation sound ROM 215 in accordance with control by the control section 213, and generates an operation sound. The reading sound generation section 220 generates a sound signal from character information inputted in accordance with control by the control section 213.

The remote controller 217 is a device for operating the operation sound guide apparatus by using infrared communication, and performs an operation of moving the cursor position on the electronic program guide 100 by using, for example, movement operation keys for horizontal and vertical directions. The remote controller light receiving section (operation information input section) 218 receives an infrared light signal from the remote controller 217 and converts the same to an electric signal. The remote controller code analysis section 219 analyzes the remote controller signal and sends a user's operation to the control section 213.

The operation sound guide apparatus according to the present embodiment, having the above configuration, operates as follows. In reproduction of a broadcast program, video of the program is processed through the tuner 201, the separating section 202, the decode processing section 203, the video processing section 204, the video signal superimposing section 206, and the video output section 208, and then reproduced in the display section 210. Meanwhile, sound of the program is processed through the tuner 201, the separating section 202, the decode processing section 203, the sound processing section 205, the sound signal superimposing section 207, and the sound output section 209, and then reproduced in the speaker 211.

Here, if a program guide key of the remote controller 217 is pressed, the remote controller code analysis section 219 analyzes the operation and issues an electronic program guide activation request to the control section 213. The control section 213 performs activation processing for the electronic program guide 100, and the screen rendering processing section 214 renders the electronic program guide 100 and the cursor 110. At this point of time, base information based on the initial cursor position is stored in the storage section 212. Here, the base information is information (service ID) about a broadcast station that has been tuned in to and viewed just before the activation.

Next, an operation of moving a program selection cursor is performed on the remote controller 217. For example, if a rightward movement key is pressed, the remote controller code analysis section 219 analyzes the operation and issues a request for rightward movement of the cursor 110, to the control section 213. The control section 213 performs cursor movement processing and the screen rendering processing section 214 renders an image in which the cursor 110 has moved to the destination program.

While the rendering processing for rendering the image in which the cursor 110 has moved to the destination program is performed, the control section 213 acquires base information from the storage section 212. The control section 213 determines whether or not broadcast station information about the program to which the cursor has moved coincides with broadcast station information of the base information. If they do not coincide, the control section 213 requests the operation sound generation section 216 to output a normal operation sound for cursor movement. If they coincide, the control section 213 requests the operation sound generation section 216 to output a base operation sound for cursor movement which is specially prepared.

The operation sound generation section 216 acquires the corresponding operation sound data from the operation sound ROM 215 in accordance with whether the request from the control section 213 is for the normal operation sound or the base operation sound, and generates the corresponding operation sound. The operation sound generation section 216 outputs the operation sound to the sound signal superimposing section 207.

Through the above operation, when a user moves the cursor 110 on the electronic program guide screen, it becomes possible to output a special operation sound for informing the user that the cursor 110 has returned to a broadcast station corresponding to the initial position (base).

Figure 4:
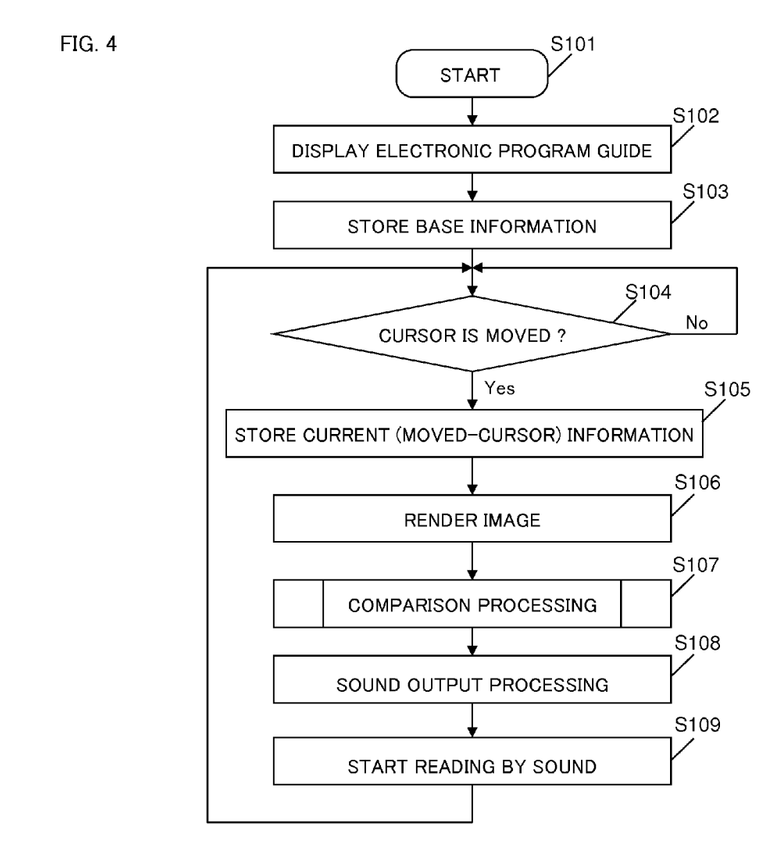
FIG. 4 is a flowchart showing a flow of the processing operation according to the first embodiment of the present invention.

FIG. 4 is a flowchart showing the above operation. The following steps are executed by the corresponding processing sections, based on an instruction from the control section 213. First, if the program guide key is pressed on the remote controller 217, the control section 213 starts the process by receiving an electronic program guide activation request in step S101. Next, in step S102, the electronic program guide 100 is acquired from the storage section 212, rendered by the screen rendering processing section 214, and then displayed on the display section 210. Next, in step S103, information about a program at the cursor position in the initial state is written as base information in the storage section 212. As described above, the base information is information about a broadcast station that has been tuned in to and viewed just before the activation.

In step S104, whether or not a cursor movement operation has been performed is determined based on information from the remote controller code analysis section 219. If a cursor movement operation has not been performed (No in step S104), the process waits for the operation. If cursor movement operation has been performed (Yes in step S104), the process proceeds to step S105. In step S105, the cursor 110 is moved on the electronic program guide 100, based on the cursor movement operation, and information (here, broadcast station information) about a program corresponding to the new cursor position is acquired as current information and written in the storage section 212. Therefore, the current information written in the storage section 212 is information about the broadcast station of the program to which the cursor 110 has moved. In step S106, the electronic program guide 100 corresponding to the moved cursor 110 is rendered and displayed.

Next, in step S107, the base information and the current information stored in the storage section 212 are compared, and an operation sound corresponding to a result of the comparison is selected and generated. This operation will be described later in detail with reference to FIG. 5. In step S108, the generated operation sound is subjected to output processing, and reproduced from the speaker 211. After the operation sound is outputted, in step S109, reading of the electronic program guide 100 by sound is started. Specifically, the control section 213 outputs information about the program corresponding to the cursor position (for example, broadcast station information, broadcasting time information, program title information, and the like), as character information, to the reading sound generation section 220. The reading sound generation section 220 generates a sound signal based on the character information, and outputs the generated sound signal to the sound signal superimposing section 207. The sound signal superimposing section 207 superimposes the sound signal outputted from the reading sound generation section 220, onto the sound signal outputted from the sound processing section 205, and outputs the resultant signal to the sound output section 209. After the reading by sound is started, the process returns to step S104 to wait for another cursor movement operation. Therefore, after the reading of the electronic program guide by sound is started, if another cursor movement operation is performed before the reading is finished, interrupt processing of steps S105 to S108 is performed even in the middle of the reading by sound (the reading by sound is interrupted in the middle). As described later, since an operation sound outputted when the cursor has returned to the base position is different from a normal operation sound, if a user has recognized from the difference in operation sounds that the cursor has returned to the base position (here, the user has already heard information about a program corresponding to the base position), the user can perform another cursor movement operation and hear reading of the next program by sound, before the previous reading of the electronic program guide 100 is finished. It is noted that if the program guide key is pressed again on the remote controller 217 or if a user requests to view a specific program, the electronic program guide is canceled and the process shown in FIG. 4 ends there.

Figure 5:
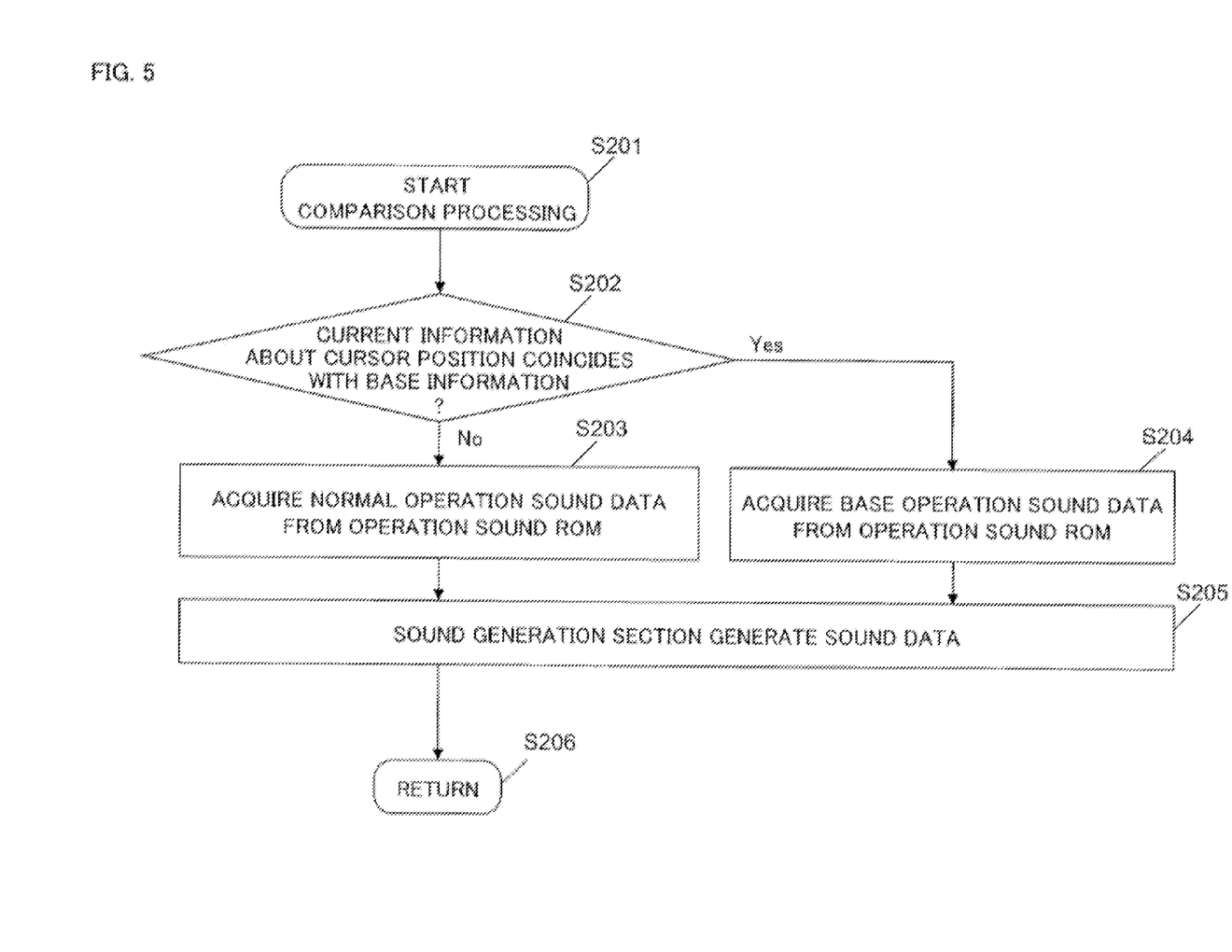
FIG. 5 is a flowchart showing the detailed process of comparison processing in the flowchart shown in FIG. 4.

FIG. 5 is a flowchart showing the detailed steps divided from step S107 in FIG. 4. In step S201, a comparison process is started. Then, first, in step S202, the current information (broadcast station information about a program corresponding to the current cursor position) is compared with the base information (broadcast station information for when the electronic program guide has been activated). If the current information is different from the base information (No in step S202), the process proceeds to step S203 to acquire normal operation sound data (second operation sound) from the operation sound ROM 215. On the other hand, the current information coincides with the base information (Yes in step S202), the process proceeds to step S204 to acquire base operation sound data (first operation sound) from the operation sound ROM 215. Finally, in step S205, the operation sound generation section 216 generates sound data corresponding to each case, whereby the series of steps of the comparison process is completed. Thereafter, the sound output processing in step S108 is to be performed.

Examples of methods for discriminating operation sounds are as follows. The number of times a short buzzer sound is emitted may be changed, the length of a continuous buzzer sound may be changed, or the volume, the tone, or the kind of sound may be changed. Alternatively, only a base operation sound may be emitted without emission of a normal operation sound.

In addition, if the cursor has reached the right end or the left end on the cursor electronic program guide screen and has looped back to the opposite end, or if the cursor has reached the right end, the left end, the upper end, or the lower end and has become unable to progress any longer, a guide sound for informing a user of that fact may be outputted to assist the user's operation. Such a mode will be described in another embodiment.

Thus, according to the operation sound guide apparatus of the present embodiment, when a user searches for a desired program on an electronic program guide screen through cursor movement operation by using a remote controller, the user can easily recognize a broadcast station of a program corresponding to the initial position of a cursor. Therefore, the operability of an electronic program guide can be significantly improved. The present embodiment is useful particularly for a person with impaired vision.

Second Embodiment

Next, an operation sound guide apparatus according to the second embodiment of the present invention will be described. In the above description, base information is broadcast station information about a program at the initial position of the cursor. Therefore, when the cursor has returned to any program of the broadcast station, no matter which time slot the program belongs to on the electronic program guide, an operation sound indicating that the cursor has returned to the base position is always outputted. For example, in FIG. 1, the initial position of the cursor 110 corresponds to a program of 2 ch at 7:00. Then, when the cursor 110 has returned to any program of 2 ch, no matter which of the time slots 6:00 to 9:00 the program belongs to, an operation sound indicating that the cursor 110 has returned to the base position is outputted, because the broadcast station of 2 ch corresponds to the base information. In this case, the following trouble can be assumed, for example. That is, when a user with impaired vision selects a program to view now based on base information, the user might select a future program that is yet to be broadcasted, so that the program does not start when the user starts to view the program.

Considering the above, only the program corresponding to the initial position of the cursor may be set as base information. In this case, for example, in FIG. 1, an operation sound indicating that the cursor has returned to the base position is outputted only when the cursor has returned to the program of 2 ch at 7:00. Thus, a user can recognize that the cursor has returned to the initial position with respect to not only the broadcast station but also the time slot. Therefore, a user can precisely recognize that the cursor has returned to the base position.

In order to realize the above configuration, not only broadcast information about a program designated by the cursor at the initial position but also time information about the program is stored as base information. Also, broadcast information and time information about a program designated by the cursor at the current position to which the cursor has moved are acquired as current information, and the current information is compared with the base information. Therefore, the present embodiment can be implemented by using the same apparatus configuration as shown in FIG. 3 and the same flowcharts as shown in FIG. 4 and FIG. 5.

Figure 6:
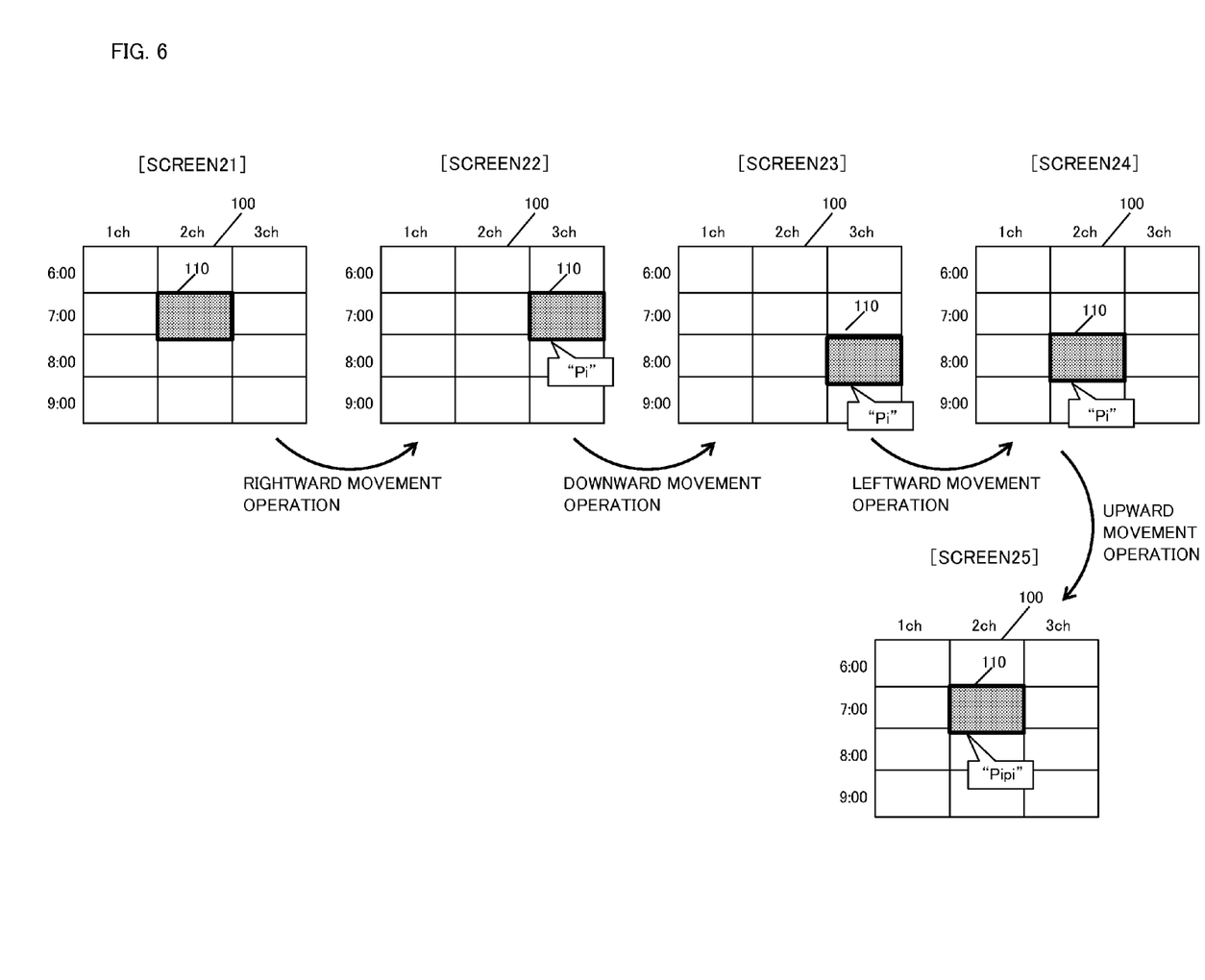
FIG. 6 is a schematic diagram showing operations on an electronic program guide screen of an operation sound guide apparatus according to the second embodiment of the present invention.

FIG. 6 is a schematic diagram showing movement of the cursor on an electronic program guide screen and operation sounds caused as a result of the movement, realized by the operation sound guide apparatus according to the present embodiment. As shown in FIG. 6, when the cursor has returned to a position indicated in a screen 25 which is the same position of a program of 2 ch at 7:00 indicated in a screen 21 which is the initial cursor position screen, a special operation sound "Pipi" for informing a user that the cursor has returned to the base position is outputted.

Further, the first embodiment and the second embodiment may be combined as follows. That is, a normal operation sound may be set as "Pi", an operation sound indicating that the cursor has returned to the same broadcast station corresponding to the initial position may be set as double ringing "Pipi", and an operation sound indicating that the cursor has returned to the same program at the initial position may be set as triple ringing "Pipipi". Thus, a user can recognize the detailed information about the cursor position from the operation sounds.

As described above, according to the operation sound guide apparatus of the present embodiment, since not only broadcast station information but also time information is included in base information, a user can recognize that the cursor has returned to the very program designated at the initial position. Thus, the operability of the electronic program guide can be further improved.

In the above embodiment, a broadcast station that a user has viewed just before the electronic program guide screen is activated is set as the base position. However, for example, a favorite broadcast station or a favorite program that a user has registered beforehand may be set as the base position.

Third Embodiment

Next, an operation sound guide apparatus according to the third embodiment of the present invention will be described. In the above description, the screen of an electronic program guide has been focused. In the present embodiment, a menu screen will be focused.

Figure 7:
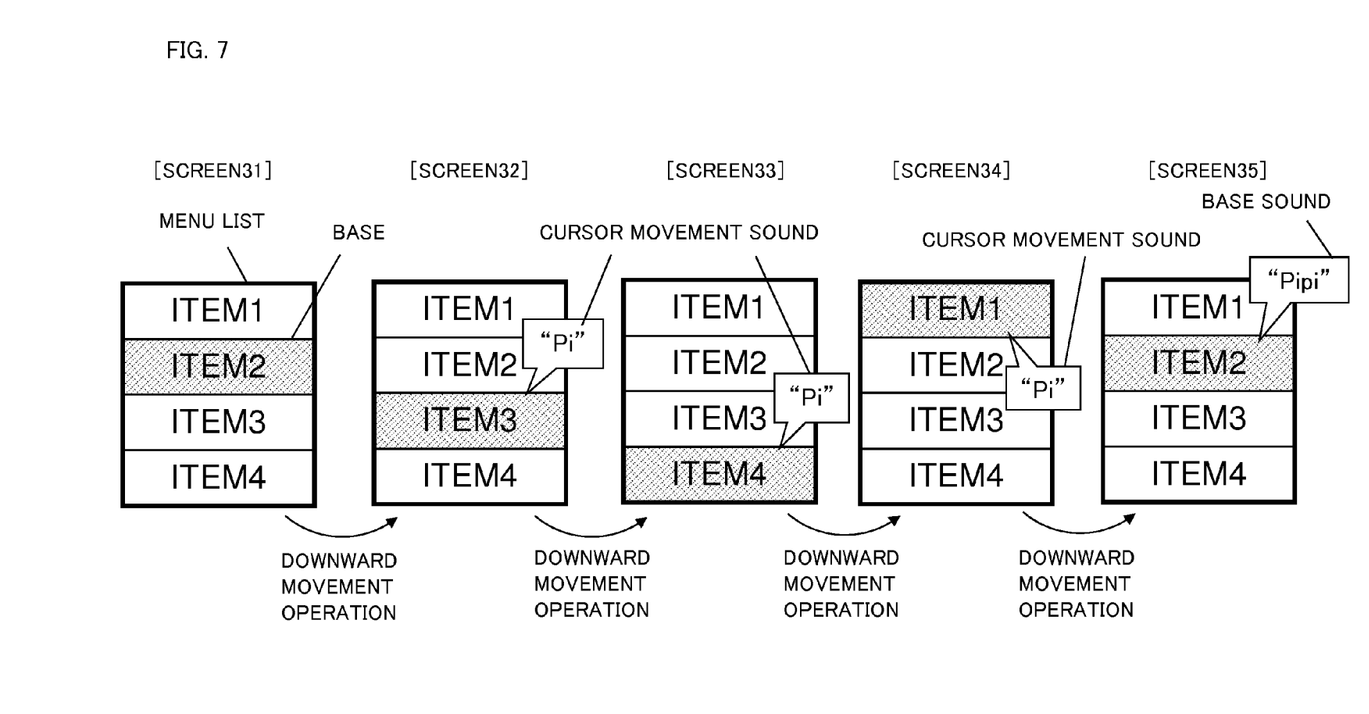
FIG. 7 is a schematic diagram showing operations on a menu screen of an operation sound guide apparatus according to the third embodiment of the present invention.

FIG. 7 is a schematic diagram showing movement of a cursor on a menu screen and operation sounds caused as a result of the movement, realized by the operation sound guide apparatus according to the present invention. Screens 31 to 35 show the menu screen which is simplified for facilitating the description. On the menu screen, menu items, "item 1" to "item 4", are indicated in the vertical axis direction.

On the menu screen, a specific menu item is visually indicated by a cursor. The screens 31 to 35 show sequential movements of the cursor based on an operation to move the cursor. The screen 31 is a screen displayed when the menu screen is activated. At this time, the initial position of the cursor is at the item 2 of the menu. This position is a base position. Here, a menu item to be set at a base position is a menu item that had been selected just before the previous menu screen was ended. It is noted that, instead, the menu item 1 which is the top item on the menu screen may be set as a base position.

From that state, if a user performs an operation of moving the cursor downward, the cursor moves to the next menu item 3 below (screen 32). Along with this operation, an electronic sound "Pi" is outputted as shown in the drawing, for example. Then, if a user performs a downward movement operation again, the cursor moves to the menu item 4 in the drawing (screen 33). Along with this operation, the electronic sound "Pi" is outputted as shown in the drawing, for example. Then, if a user performs a downward movement operation again, the cursor transfers to the item 1 at the upper end because the item 4 is the lower end in the drawing (screen 34). Also here, the operation sound "Pi" is outputted.

Then, if a user further performs a downward movement operation, the cursor transfers to the next menu item 2 below (screen 35). Here, as described above, the base position of the cursor when the menu screen has been activated is the item 2. Therefore, in the operation at this time by which the cursor has returned to the original item 2, an operation sound "Pipi" which is different from the normal one is outputted in order to aurally inform a user that the cursor has returned to the menu item at the base position. Thus, a user can aurally and easily recognize that, as a result of the cursor movement operation, the cursor has returned to the menu item 2 which is the menu item at the base position.

Although in FIG. 7, the number of menu items is four for facilitating the description, the present invention is not limited thereto. In actual digital television broadcasting, more menu items may be provided. Similarly to the previously-described case of increase in the number of broadcast stations on an electronic program guide, the more the number of menu items is, the more useful it is to output an operation sound for informing a user that the cursor has returned to the menu item at the base position after moving through the menu items, in cursor movement operations. In addition, in the above embodiment, the cursor can loop in the vertical direction on the menu screen. However, a menu screen on which the cursor can loop in the horizontal direction may be used. Also in this case, the same effect can be obtained by the same processing.

The above operation is realized by the processes of the flowcharts shown in FIG. 4 and FIG. 5 being executed. The control section 213 executes the flowcharts, the electronic program guide being replaced by the menu screen in FIG. 4. It is noted that in step S109, a menu item is read out by sound, instead of the electronic program guide.

Thus, according to the operation sound guide apparatus of the present embodiment, when a user searches for a desired menu item such as image quality adjustment or sound quality adjustment on a menu screen through cursor movement operation by using a remote controller, the user can easily recognize the menu item corresponding to the initial position of the cursor. Therefore, the operability of a menu screen can be significantly improved. The present embodiment is useful particularly for a person with impaired vision.

It is noted that when the cursor loops from the screen 33 to the screen 34, an operation sound (loop sound) that is different from the normal operation sound and is different from the operation sound indicating that the cursor has returned to the base position may be outputted.

Fourth Embodiment

In the electronic program guide of the first embodiment or the second embodiment, and in the menu screen of the third embodiment 3, some cursor movements are not allowed. In the electronic program guide, for example, since an electronic program guide for programs to be broadcasted after predetermined days or later may not be distributed (here, it will be assumed that only an electronic program guide for one week of programs is distributed), the cursor is not allowed to move to a portion for eight or more days later. In the menu screen, in the third embodiment described above, if the cursor is operated to be moved downward from the item 4, the cursor transfers to the item 1. However, if the cursor is set so as not to transfer to the item 1, the item 4 is a terminal so that the cursor is not allowed to move downward from the item 4. If such an operation of the cursor that is not allowed is performed as described above, it is preferable that another operation sound that is different from the normal operation sound and is different from the operation sound indicating that the cursor has returned to the base position is outputted. The operation sound guide apparatus according to the present embodiment outputs an alarm sound for such a cursor operation that is not allowed.

Figure 9:
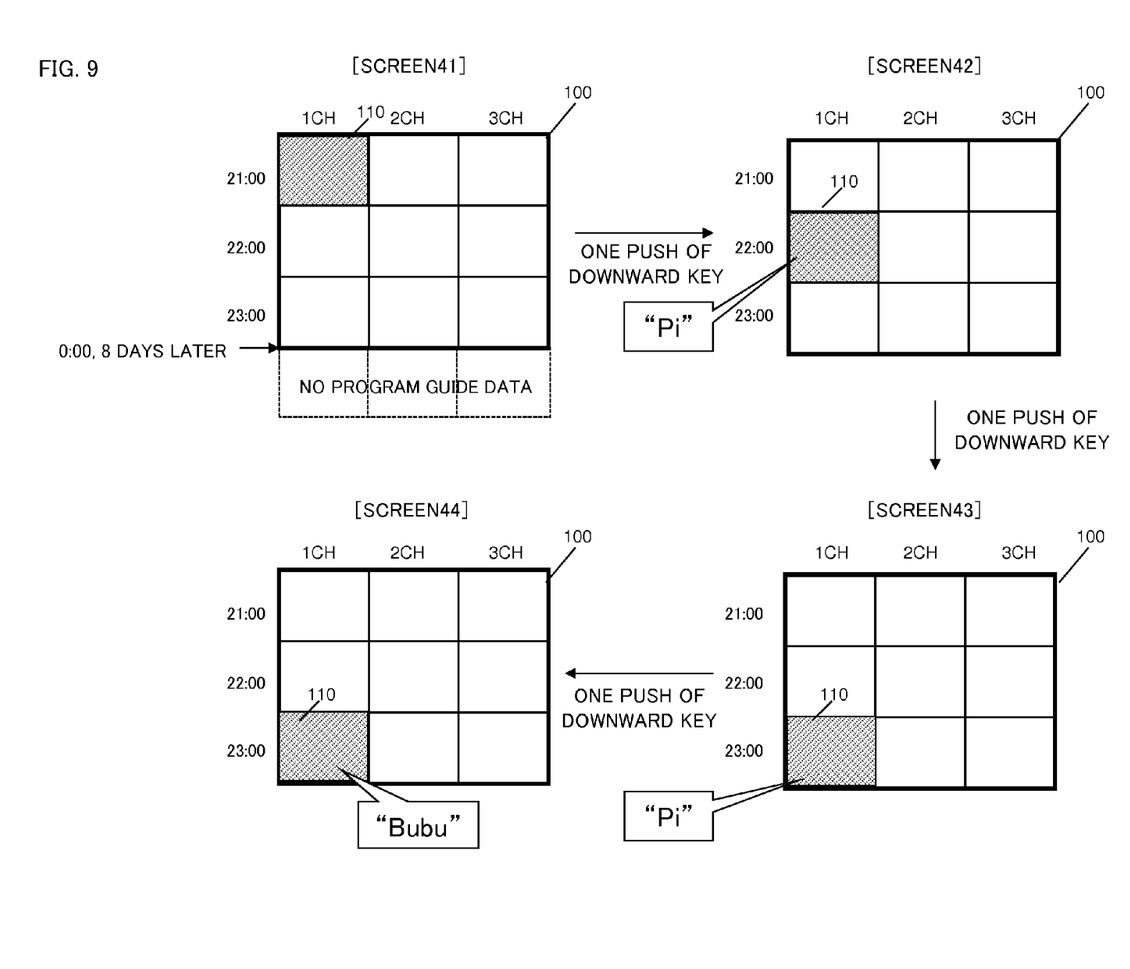
FIG. 9 is a schematic diagram showing operations on an electronic program guide screen of an operation sound guide apparatus according to the fourth embodiment of the present invention.

FIG. 9 is a schematic diagram showing movement of a cursor on an electronic program guide screen and operation sounds caused as a result of the movement, realized by the operation sound guide apparatus according to the present invention. Screens 41 to 44 show the electronic program guide 100 which is simplified for facilitating the description. On the electronic program guide 100, a table is formed on which digital television broadcasting stations "1 ch" to "3 ch" are displayed in the horizontal axis direction and the broadcasting times "21:00" to "23:00" are displayed in the vertical axis direction. It is noted that the above broadcasting times are those for one week later from the present time. Therefore, an electronic program guide for programs to be broadcasted after 24:00 (that is, 0:00 eight days later) is yet to be distributed, and is not present. In addition, since the previous electronic program guide is not present, the cursor is not allowed to move to a time slot earlier than the current time slot.

On the electronic program guide 100 for seven days later from the present time, a specific program is visually indicated by the cursor 110. The screens 41 to 44 show sequential movements of the cursor 110 based on an operation to move the cursor 110. The screen 41 is a screen displayed when the electronic program guide 100 is activated. At this time, the initial position of the cursor 110 is at a program of 1 ch in a time slot of 21:00. This position is a base position.

From that state, if a user performs an operation of moving the cursor downward, the cursor 110 moves to the next program below, i.e., a program of the same channel 1 ch in a time slot of 22:00 (screen 42). Along with this operation, an electronic sound "Pi" is outputted as shown in the drawing, for example. Then, if a user performs a downward movement operation again, the cursor 110 moves to the next program below, i.e., a program of the same channel 1 ch in a time slot of 23:00 (screen 43). Along with this operation, the electronic sound "Pi" is outputted as shown in the drawing, for example.

Even if a user further performs a downward movement operation, the cursor 110 does not move. This is because an electronic program guide for time slots below the current position of the cursor is not present and the cursor is not allowed to further move downward. For such an operation of the cursor that is not allowed, an operation sound "Bubu" that is different from the normal operation sound "Pi" and is different from the operation sound "Pipi" indicating that the cursor has returned to the base position is outputted in order to aurally inform a user that the cursor cannot move. Thus, a user can aurally and easily recognize that a cursor movement operation cannot be performed.

Figure 8:
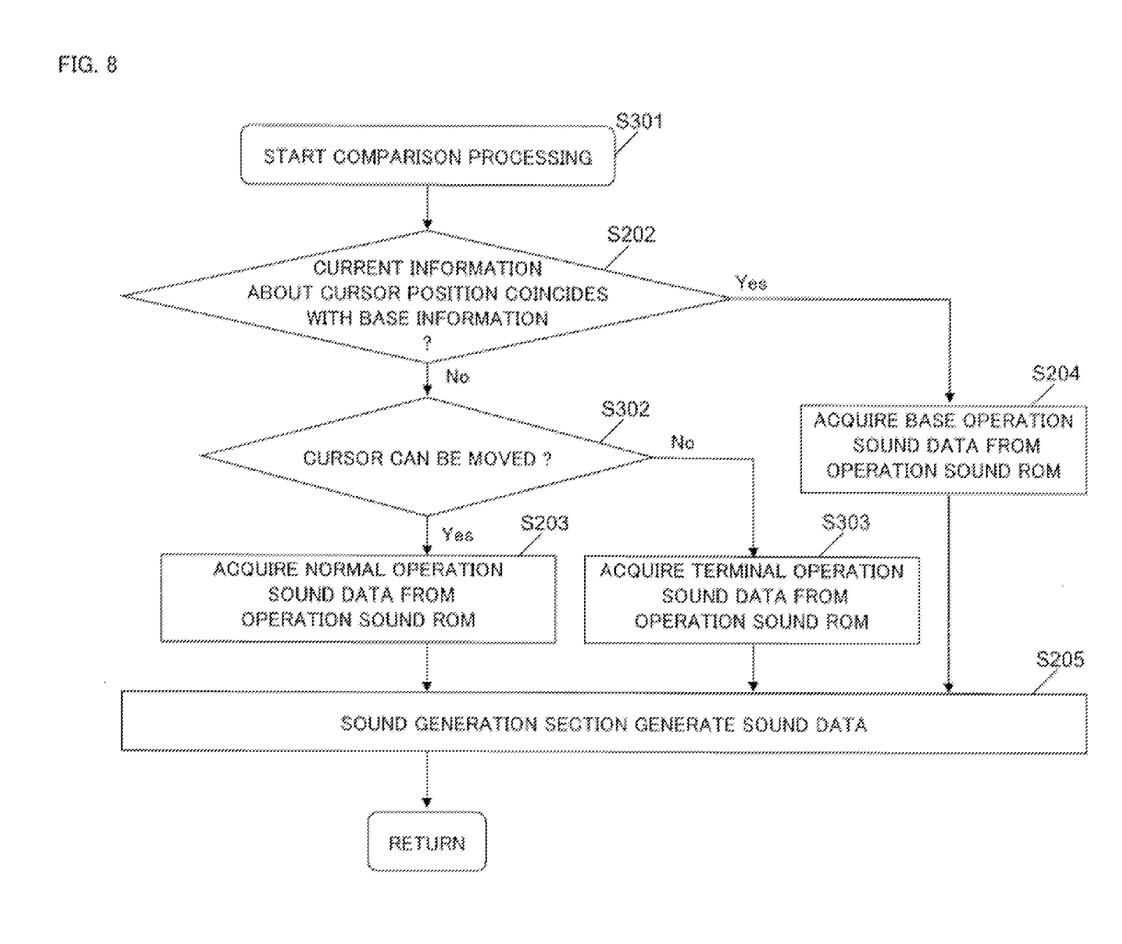
FIG. 8 is a flowchart showing the detailed process of comparison processing according to the fourth embodiment of the present invention.

The above operation is realized by the processes of the flowcharts shown in FIG. 4 and FIG. 8 being executed. The flowchart shown in FIG. 8 is a flowchart partially changed from the flowchart shown in FIG. 5. The same steps between FIG. 8 and FIG. 5 are denoted by the same reference numerals and indicate the same processings. Therefore, the description of the same steps is omitted. With reference to FIG. 8, steps different from those in FIG. 5 will be described.

FIG. 8 is a flowchart showing the detailed steps divided from step S107 in FIG. 4. In step S301, comparison processing is started. If the current information and the base information are different (No in step S202), the process proceeds to step S302, and whether or not the cursor can be moved is determined. If the cursor can be moved (Yes in step S302), the process proceeds to step S203. On the other hand, if the cursor cannot be moved (No in step S302), the process proceeds to step S303. In step S303, terminal operation sound data (third operation sound) which is different from the normal operation sound data (second operation sound) and is different from the base operation sound data (first operation sound) is acquired from the operation sound ROM 215. As a method for discriminating operation sounds, a sound that alarms a user may be used for the terminal operation sound, for example.

Thus, according to the operation sound guide apparatus of the present embodiment, when a user searches for a desired program on an electronic program guide screen through cursor movement operation by using a remote controller, the user can easily recognize that the cursor cannot be moved. Therefore, the operability of an electronic program guide can be significantly improved. The present embodiment is useful particularly for a person with impaired vision. In addition, the present embodiment may be applied to a menu screen, or may be combined with another embodiment.

Other Embodiments

In the above four embodiments, broadcast station information (service ID), time information about programs, or menu item information has been used for determination of base information. Instead, an index value may be assigned to each column of an electronic program guide or each row of menu items, and may be used for the determination. Alternatively, channel preset information which is uniquely set for each broadcast station may be used for the determination.

INDUSTRIAL APPLICABILITY

The present invention is useful in the case where a user moves a cursor to select a desired program on a screen of an electronic program guide on which a large number of programs are displayed. The present invention is generally applicable to video apparatuses using an electronic program guide. In addition, besides an electronic program guide, the present invention is generally applicable to operation terminals and the like that display a large number of menu items.

DESCRIPTION OF THE REFERENCE CHARACTERS 100 electronic program guide
110 cursor
201 tuner
202 separating section
203 decode processing section
204 video processing section
205 sound processing section
206 video signal superimposing section
207 sound signal superimposing section
208 video output section
209 sound output section
210 display section
211 speaker
212 storage section
213 control section
214 screen rendering processing section
215 operation sound ROM
216 operation sound generation section
217 remote controller
218 remote controller light receiving section
219 remote controller code analysis section
220 reading sound generation section

The invention claimed is:

1. For a digital television, a sound-guided operation device for sound-guided cursor navigation through onscreen electronic program guides, the sound-guided operation device comprising:
   a television-signal separating section for separating channel-tuned, broadcast-station-specific demodulated television-signal data, output from a tuner in the digital television, into video and sound signals, and attachment data including an electronic program guide for displaying a menu of channel-specific program and broadcast time information;
   a control section;
   a storage section storing base information and for storing current information, the base information and current information being broadcast-station information or broadcast-time information contained in the attachment data separated out by the television-signal separating section, loaded into the storage section by the control section, wherein the base information indicates cursor initial position, and the current information indicates cursor current position, on the electronic program-guide menu as displayed on the digital television;
   a cursor-operation information receiving section, operatively connected with the control section, for receiving cursor-operation information signals;
   an operation sound generation section for generating, under control by the control section, operation-indicating sound when the cursor is operated;
   a screen-rendering processing section, operatively connected with the control section, for rendering the electronic program-guide data and the cursor-operation information signals as video output signals superimposed onto the video signals separated by the television-signal separating section, for onscreen display by the digital television of the electronic program-guide menu and cursor movement relative to the menu; wherein
   the control section is configured to
      store into the storage section the cursor initial position indicated by the base information,
      based on cursor-operation information signals from the cursor-operation information receiving section, cause the screen-rendering processing section to indicate cursor movement in the superimposed video signals output for onscreen display by the digital television,
      write as current information into the storage section the broadcast-station information or broadcast-time information corresponding to any cursor new position on the electronic program-guide menu,
      compare the current information, written into the storage section and indicating any cursor new position, with the base information, stored in the storage section and indicating cursor initial position, and
      conditional on the current information coinciding with the base information, cause the operation sound generation section to generate a first operation sound, and conditional on the current information not coinciding with the base information, cause the operation sound generation section to generate a second operation sound, different from the first operation sound; and a sound-signal superimposing section for superimposing the operation-indicating sound generated by the operation sound generation section onto sound signals output to a speaker in the digital television.

2. The sound-guided operation device according to claim 1, wherein the first operation sound differs from the second operation sound in at least one selected from volume, tone, length, and number of emission times.

3. The sound-guided operation device according to claim 1, further comprising:

an operation sound storage section configured to store the first operation sound and the second operation sound, wherein the operation sound generation section acquires the first operation sound or the second operation sound from the operation sound storage section, and generates the operation sound.

4. The sound-guided operation device according to claim 1, further comprising an alarm control section configured to cause, when the cursor is operated to be moved in a direction that is not allowed, the operation sound generation section to generate a third operation sound which is different from the first operation sound and is different from the second operation sound, based on operation information about the cursor that is received by the cursor-operation information receiving section.

5. For a digital television, a sound-guided operation device for sound-guided cursor navigation through onscreen menu items, the sound-guided operation device comprising:

a television-signal separating section for separating channel-tuned, broadcast-station-specific demodulated television-signal data, output from a tuner in the digital television, into video and sound signals;

a control section;

a storage section storing, as base information, broadcast-station-specific channel preset information, and for storing current information, the base information indicating cursor initial position, and the current information indicating cursor current position, in the menu items as displayed on the digital television;

a cursor-operation information receiving section, operatively connected with the control section, for receiving cursor-operation information signals;

an operation sound generation section for generating, under control by the control section, operation-indicating sound when the cursor is operated;

a screen-rendering processing section, operatively connected with the control section, for rendering the menu items and the cursor-operation information signals as video output signals superimposed onto the video signals separated by the television-signal separating section, for onscreen display by the digital television of the menu items and cursor movement relative to the menu items; wherein the control section is configured to store into the storage section the cursor initial position indicated by the base information, based on cursor-operation information signals from the cursor-operation information receiving section, cause the screen-rendering processing section to indicate cursor movement in the superimposed video signals output for onscreen display by the digital television, write as current information into the storage section menu-item information corresponding to any cursor new position in the menu items, compare the current information, written into the storage section and indicating any cursor new position, with the base information, stored in the storage section and indicating cursor initial position, and conditional on the current information coinciding with the base information, cause the operation sound generation section to generate a first operation sound, and conditional on the current information not coinciding with the base information, cause the operation sound generation section to generate a second operation sound, different from the first operation sound; and a sound-signal superimposing section for superimposing the operation-indicating sound generated by the operation sound generation section onto sound signals output to a speaker in the digital television.

6. For a digital television including a storage section, a cursor-operation information receiving section, an operation sound generation section, and a screen-rendering processing section, a sound-guided cursor navigation method for navigating the cursor through onscreen menu items, the method comprising:

storing as base information into the storage section one selected from broadcast-station information, broadcast-time information, or broadcast-station-specific channel preset information, the base information indicating cursor initial position in the menu items as displayed on the digital television;

receiving cursor-operation information signals through the cursor-operation information receiving section;

storing into the storage section the cursor initial position indicated by the base information;

writing as current information into the storage section menu-item information corresponding to any cursor new position in the menu items as current information;

causing the screen-rendering processing section to render the menu items for onscreen display by the digital television, and based on the cursor-operation information signals from the cursor-operation information receiving section, causing the screen-rendering processing section to indicate cursor movement relative to the menu items;

comparing the current information, written into the storage section and indicating any cursor new position, with the base information, stored in the storage section and indicating cursor initial position;

conditional on the current information coinciding with the base information, causing the operation sound generation section to generate a first operation sound, and conditional on the current information not coinciding with the base information, causing the operation sound generation section to generate a second operation sound, different from the first operation sound; and superimposing the operation-indicating sound onto sound signals output to a speaker in the digital television.

* * * * *